United States Patent [19]
Fritsch et al.

[11] Patent Number: 6,048,063
[45] Date of Patent: *Apr. 11, 2000

[54] UNDERWATER CONTACT LENS

[76] Inventors: Michael H. Fritsch, 10630 Orchard Crossing Dr., Indianapolis, Ind. 46280; Thomas M. Fritsch, 5656 Calvert St., Lincoln, Nebr. 68506

[*] Notice: This patent is subject to a terminal disclaimer.

[21] Appl. No.: 09/184,693

[22] Filed: Nov. 2, 1998

Related U.S. Application Data

[62] Division of application No. 08/657,976, May 30, 1996, Pat. No. 5,831,713.

[51] Int. Cl.$^7$ .................................................. G02C 7/04
[52] U.S. Cl. .................................. 351/160 R; 351/160 H
[58] Field of Search ........................... 351/160 R, 160 H, 351/161, 162, 177

[56] References Cited

U.S. PATENT DOCUMENTS

4,174,156  11/1979  Glorieux .................................. 351/161

*Primary Examiner*—Scott J. Sugarman
*Attorney, Agent, or Firm*—Vincent L. Carney

[57] ABSTRACT

To permit vision underwater, a contact lens has a center portion that includes underwater correction of vision and a peripheral portion that sufficiently conforms in curvature with the cornea of an eye to hold the contact lens to the eye. In one embodiment, the lens provides a correction adequate for both underwater and above water use and in another embodiment, underwater correction is provided when wet and above water correction is provided when dry.

5 Claims, 9 Drawing Sheets

CORNEA RADIUS = 7.67   WATER INDEX = 1.33   Y = 1.0 MM (RADIUS OF PUPIL)
NORMAL NEAR POINT IS 250 MILLIMETERS NORMAL FAR POINT IS 1000000 MILLIMETERS
NEAR POINT RADII LOWER CURVE, FAR POINT RADII UPPER CURVE

CORNEA RADIUS = 7.67  WATER INDEX = 1.33  Y = 1.0 MM
NORMAL NEAR POINT IS 250 MILLIMETERS  NORMAL FAR POINT IS 1000000 MILLIMETERS
NEAR POINT RADII LOWER CURVE, FAR POINT RADII UPPER CURVE

UNDERWATER CONTACT LENS

RELATED CASES

This application is a divisional of U.S. parent application Ser. No. 08/657,976 filed May 30, 1996, entitled UNDERWATER CONTACT LENS now U.S. Pat. No. 5,831,713.

BACKGROUND OF THE INVENTION

This invention relates to underwater vision devices. Specifically, this invention relates to underwater vision devices worn directly on the eye cornea, as a contact type lens, which provides strong correction below the water surface to permit a wearer to see as well underwater as he would normally see in an air environment.

In the prior art underwater vision devices, separate lenses are spaced from the cornea of the eye in the manner of spectacles and have a surface upon them with an index of refraction that compensates for the path of light entering the eye to correct it so that it conforms to the path provided in air and has sufficient magnification so that the swimmer sees normally under the water.

In some of these prior art units, a lens has a refractive index that does not completely correct for the Abbe number and aberration in air nor correct for the Abbe number and aberration in water but has a value between the two values necessary for water and air correction so as to partly correct for each. Thus, it is useful either above the water or below the water.

The prior art types of underwater vision devices have disadvantages in that they are worn external to the eyeball, are unduly bulky, complex, and have a narrow field of vision. For example, several United States patents disclose underwater optical systems that utilize different types of optical media of varying refractive indexes. Some such patents are U.S. Pat. No. 2,008,530 to Wick, U.S. Pat. No. 2,088,262 to Grano, U.S. Pat. No. 3,040,616 to Simpson, U.S. Pat. No. 3,672,750 to Hagen, U.S. Pat. No. 3,976,364 to Lindemann, U.S. Pat. No. 2,730,014 to Ivanoff, U.S. Pat. No. 3,320,018 to Pepke, and U.S. Pat. No. 4,256,386 to Herbert.

A contact lens for use above water is disclosed in U.S. Pat. No. 1,929,228. This lens is formed by outer and inner thin transparent members which do not have substantial thickness but the contact lens does have a space between the outer and inner members to provide an additional interface that may correct the wearer's vision for refactive index and the Abbe number.

SUMMARY OF THE INVENTION

Accordingly, it is an object of the invention to provide a novel underwater vision device. It is a further object of the invention to provide a method for seeing under the water.

It is a still further object of the invention to provide an underwater vision device which is simple in structure and includes both a vision correction and an underwater correction.

It is a still further object of the invention to compensate for any other ordinarily encountered vision problems of the wearer in addition to compensating for the difference between the refractive index of water and air.

In accordance with the above and further objects of the invention, an underwater vision device is formed as a contact lens having a peripheral portion for holding the lens to the eye and a central portion for correcting vision in a manner relevant to permitting the wearer to see underwater. In another embodiment, the peripheral portion is not used, and instead, an adhesive film is used between the lens and the cornea. The central portion is sized and shaped to provide water correction. It may also provide any other necessary vision correction normally required by the wearer such as for example astigmatism, myopia and hyperopia. Additionally, color compensation or filtration may be improved.

The contact lens provides one or more interfaces between two materials, such as water and the lens material, to change the path of light as it passes from the water to the cornea of the eye. The contact lens has refractive index, thickness and curvature that alter the course of light underwater to approximate the visual effect the light has when viewing an object above the water.

The lens may be made of any of a number of different materials selected for suitability, and particularly selected for refractive index. The refractive index of the material and the thickness and curvature of the lens determine the correction. The lenses may be inserted before entering the water and the user may wear the lens formed for underwater viewing when above water while also wearing spectacles with a reverse correction to the underwater correction. Thus, the user may remove the spectacles when entering the water and put them on after leaving the water.

In one embodiment, a lens may be constructed to avoid the need for spectacles. In this embodiment, the lens may be made of a material that absorbs water when under the surface of a body of water and loses water when above the surface of the body of water, but which is not in itself soluable in water. With such a material, the lens may be worn both under the water and above the water if designed for correction in air when the lens does not contain water and for correction underwater when the lens includes water.

In another embodiment, the lens has an air space within the corrective portion of the lens. This air space allows for correction of vision underwater by a lens worn directly on the eye cornea. Several interfaces with different curvatures and indexes of refraction may be used such as from water to plastic, plastic to air and air back to plastic interfaces.

From the above description, it can be understood that the underwater contact lens of this invention has the advantages of being inexpensive, being simple, providing a wide field of vision and being compact.

SUMMARY OF THE DRAWINGS

The above noted and other features of the invention will be better understood from the following detailed description when considered with reference to the accompanying drawings, in which.

DETAILED DESCRIPTION

Figures 1, 2, 3, 4:
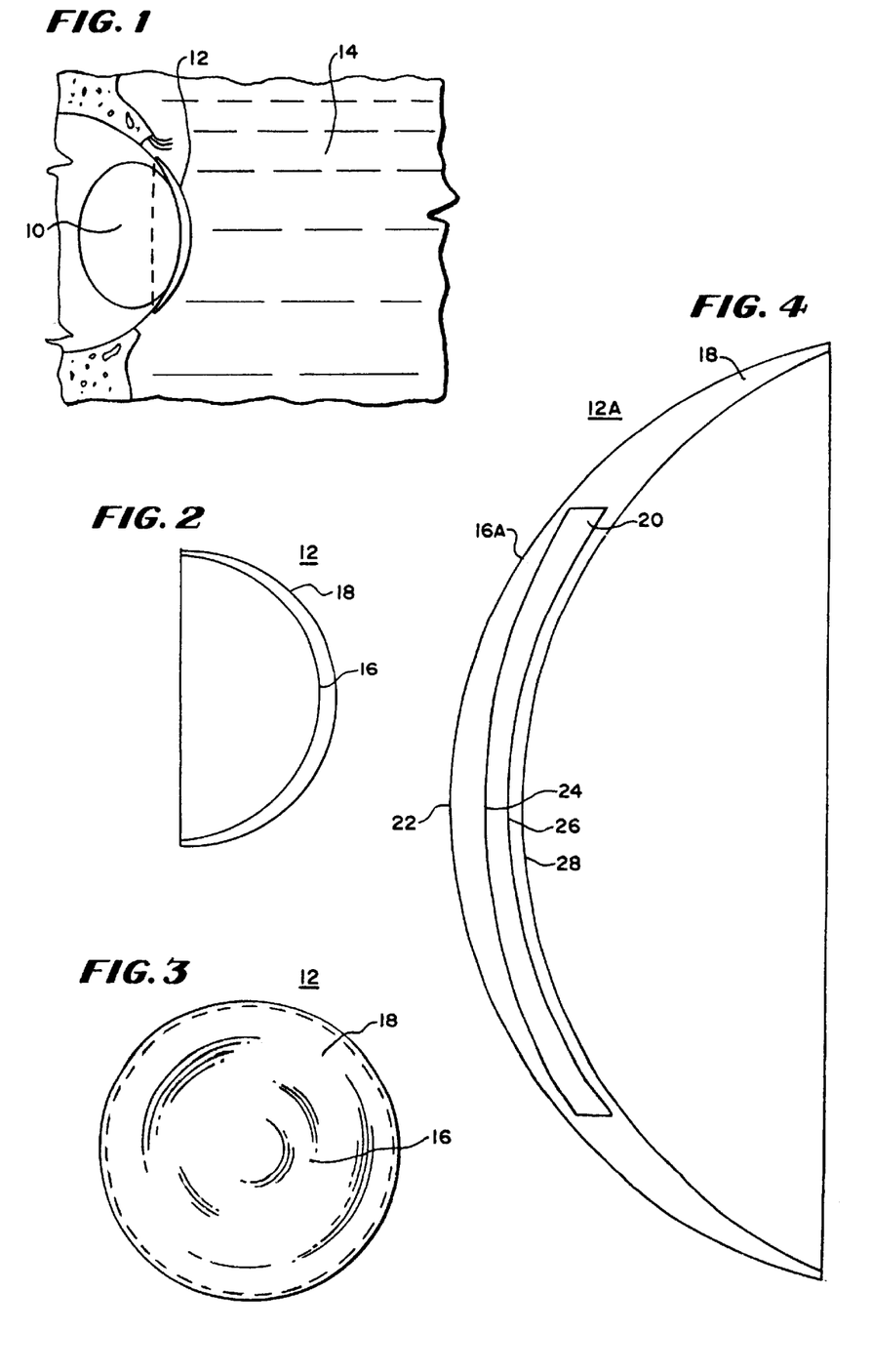
FIG. 1 is a fragmentary side elevational view of an eye fitted with one embodiment of underwater contact lens of this invention.
FIG. 2 is a sectional view of the lens in FIG. 1.
FIG. 3 is a front elevational view of the lens of FIG. 2.
FIG. 4 is a sectional view of another embodiment of lens.

In FIG. 1, there is shown a fragmentary side elevational view of a contact lens 12 directly in contact with a swimmer's cornea 10 while under the water 14. Except for the underwater correction, the underwater contact lens 12 is, in principle of operation to correct vision, similar to a typical contact lens of the hard, semi-permeable, or permeable type worn in everyday use when not swimming and may be made of the same materials. For example, the material may include glass or polymethylmethyacrylate or fluoro silicone acrylate, or silicone acrylate or copolymers such as a copolymer of vinyl pyrrolidine and polymethylmethyacrylate but in at least one embodiment the material may be made of a permeable material such as polyethylene glycol.

Any material can serve as the construction material so long as it serves the purpose of providing correction of vision underwater and can be safely and comfortably used by the wearer. Whatever the lens material, it should include a central corrective portion of the lens to provide magnification having an underwater correction for both the Abbe number and for the refractive index. The center corrective portion of the lens may also include any other visual correction normally desired by the person wearing it.

In FIG. 2, there is shown a side sectional elevational view of only the lens 12 having a peripheral portion 18 shaped with a curvature to hold it on the eye in a manner known in the art and a central corrective portion 16. The thickness of the corrective portion 16 of the lens 12 and the shape of the corrective portion 16 of the lens 12 are selected to provide a suitable focal length for correcting underwater vision. As shown in FIG. 3, the central corrective portion 16 forms a lens to provide the desired magnification and the peripheral portion 18 is adapted to fit on the eye and maintain the lens in place. It provides a wide field of view in the same manner as contact lens because of its closeness to the cornea of the eye.

The walls of the lens should have a shape, degree of uniformity and flexibility that prevents distortion with changes in pressure such as barometric changes.

The peripheral portion is sized to reduce the tendency for the contact lens to leave the eye underwater and is larger than generally used in above water lens unless another holding mechanism such as an adhesive is used to strengthen the bonding between the cornea and the contact lens. If an adhesive is not used, the peripheral portion must be large enough to prevent the ready separation of the lens from the cornea by the water. Generally, it will have a radial distance between the inner circumference and outer circumference of between 2 millimeters to 10 millimeters so as to extend to a location where it more than covers the iris by between 0.5 and 6 millimeters.

In one embodiment, the lens is adapted for use both above the water and under the water. In this embodiment, a permeable lens or lens with a leaky compartment has a refractive index that provides underwater corrections when water is absorbed into it or leaked into the compartment, but when it is above the water, it is substantially dry to provide the normal correction in air.

In FIG. 4, there is an enlarged side, elevational, sectioned view of another embodiment of lens 12A similar to the embodiment 12 of FIGS. 1–3 but including an air pocket 20 within the corrective portion 16A of the lens. This arrangement has five interfaces. They are: (1) a water-to-plastic interface 22; (2) a plastic-to-air interface 24; (3) an air-to-plastic interface 26; and (4) a plastic-to-film or cornea interface 28. Generally, there will be a natural biological film between the cornea and the lens of insignificant thickness. The film may be the normal biological lacrimal secretions, or under some circumstances, the user may apply a different film as a lubricant, an adhesive, a protective barrier or an analgesic.

In this embodiment, the curvature of the interfaces 22, 24, 26 and 28, and the changes in refractive index provide further focusing of light to enable a correction from water to air that enables the wearer to see as well under the water as he would normally see in the air.

In the preferred embodiment, the lens is shaped as in the embodiment of FIG. 3. The lens material is polyethylene glycol and is permeable. Polyethylene glycol has an index of refraction of 1.495. The lens thickness is less than one-half a millimeter at its maximum thickness, which is located at the center along the optical axis of the lens, and the radius of lens curvature at the corrective portion is less by a factor (hereinafter referred to as the water correction factor) intended to compensate for the water interface in conjunction with the increased thickness of the lens.

In the preferred embodiment, the water correction factor is 3.58 millimeters so that the lens reduces the effective center of curvature of the cornea from 7.67 to 4.09 millimeters which together with the 0.5 millimeter thickness of the lens at this portion corrects for water.

In the embodiment of FIGS. 3 and 4, the correction factor is in the range of 3 to 4 millimeters and the maximum thickness of the lens is in the range of 0.2 to 0.8 millimeters in addition to any reduction in the effective radius of curvature caused by the normal correction of the eye by the lens. In the embodiment of FIG. 4, the air bubble 20 or pockets or other openings enables a thinner lens to be used to obtain the same correction. Because the correction for water is relatively constant although it varies slightly depending on the radius of the cornea, the same value may be used for different users.

However, a more exact calculation for the embodiment of FIG. 3 can be obtained by solution of equations 1–14. Computation using these equations yields tables and graphs for better delineation of lens parameters for any material considered. These equations are relatively complex and must be solved together in an interative fashion in a manner known in the art.

For the embodiment of FIG. 4, the depth of the air space or bubble 20 in the direction of the optical axis is determined by equations 15–32. In considering any material for suitability, tables and graphs can be produced to help delineate parameters for the lens.

Figure 6:
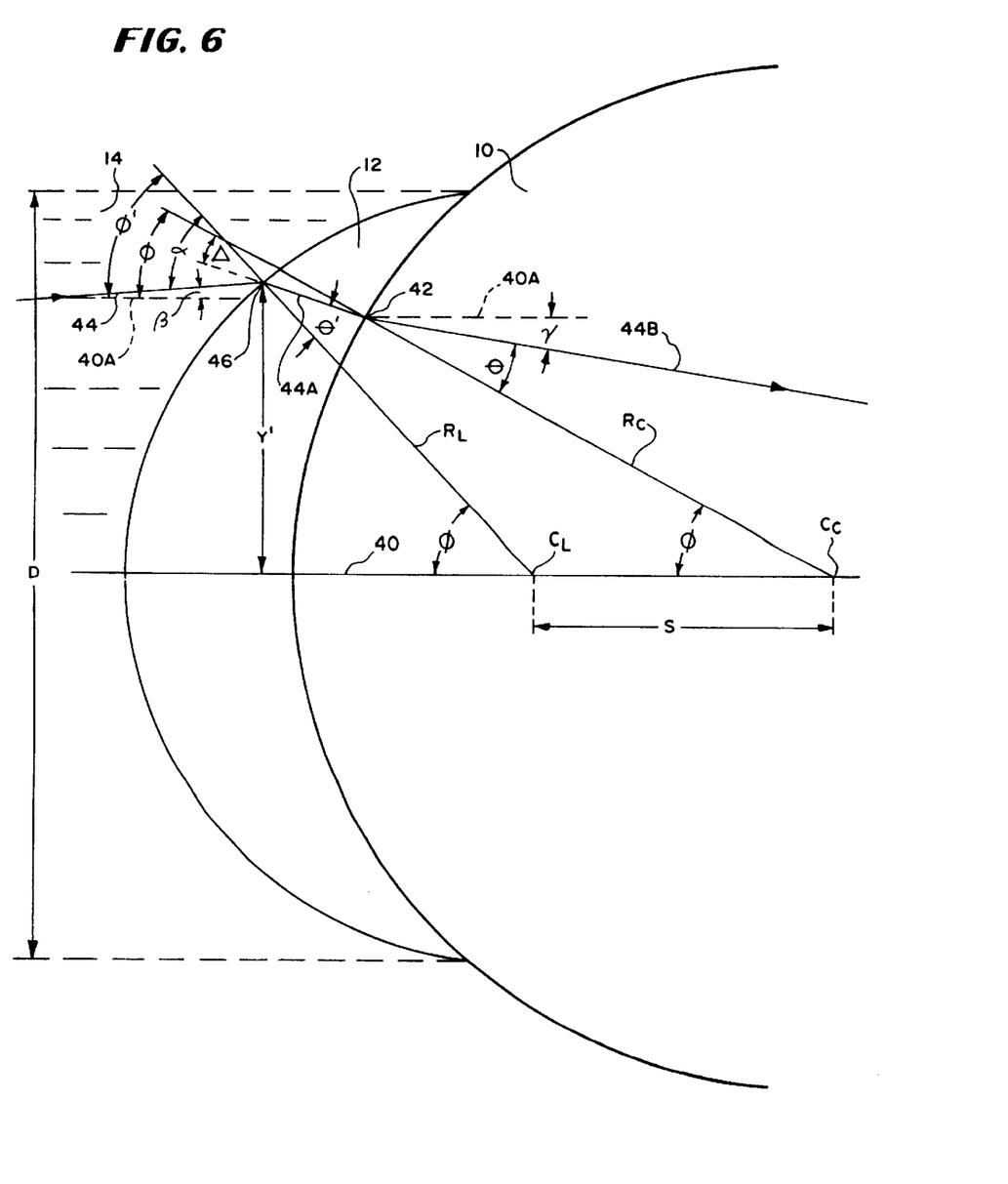
FIG. 6 is a diagrammatic sketch of a cornea with an underwater lens on it below the water showing the effect of the lens, water and cornea.

A simple lens in accordance with the embodiments of FIGS. 1–3 for use underwater has a diameter, D, for the corrective portion of the lens (FIG. 6) defined by $$D = 2X(R_C^2 - X^2)^{1/2}, \qquad \text{Equation 1}$$

$$R_L \sin(\phi') = R_C \sin(\phi) + (s + R_L \cos(\phi') - R_C \cos(\phi)) \tan(\phi-\delta) \qquad \text{Equation 2}$$

$$X = (R_C^2 - R_L^2 + s^2)/2s. \qquad \text{Equation 3}$$

$$t_{max} + R_C - R_L = s. \qquad \text{Equation 4}$$

$$\tan(\gamma) = y/NP \qquad \text{Equation 5}$$

$$\tan(\gamma) = y/FP, \qquad \text{Equation 6}$$

$$n_C \sin(\theta) = 1.00 \sin(\phi+\gamma). \qquad \text{Equation 7}$$

$$\sin(\phi) = y/R_C. \qquad \text{Equation 8}$$

$$F.P. = N.P. = y'/\tan(\beta). \qquad \text{Equation 9}$$

$$n_L \sin(\delta) = n_C \sin(\theta) = 1.00 \sin(\phi+\gamma), \qquad \text{Equation 10}$$

$$\theta' = \phi' - \phi + \delta, \qquad \text{Equation 11}$$

$$n_W \sin(\alpha) = n_L \sin(\theta'), \qquad \text{Equation 12}$$

$$\beta = \alpha - \phi' \qquad \text{Equation 13}$$

$$y' = R_L \sin(\phi') \qquad \text{Equation 14}$$

$$R1 \sin(\phi1) = R_C' \sin(\phi_C) - (R1 \cos(\phi_1) - S1 - R_C' \cos(\phi_C)) \tan(\epsilon - \phi_C). \qquad \text{Equation 15}$$

$$R2 \sin(\phi2) = R_1 \sin(\phi_1) - (R2 \cos(\phi_2) + S2 - (R_1 \cos(\phi_1) - S1)) \tan(\eta - \phi1). \qquad \text{Equation 16}$$

$$W_B = 2 \text{ square root of } (R1^2 - (X1 + S1)^2) \qquad \text{Equation 17}$$

$$X1 = ((R1^2 - R2^2) + (d - S2)^2 - S1^2)/(2 \times (S1 + S2 - d)) \qquad \text{Equation 18}$$

$$W_L = 2 \text{ square root of } (R_C^2 - X^2) \qquad \text{Equation 19}$$

$$X = (R_C^2 - R2^2 + S2^2)/(2 \times S2) \qquad \text{Equation 20}$$

$$n_L \sin(\eta) = n_b \sin(\epsilon'). \qquad \text{Equation 21}$$

$$R_C' \sin(\phi_C) = R_C \sin(\phi) + (R_C' \cos(\phi_C) - R_C \cos(\phi)) \tan(\phi-\delta). \qquad \text{Equation 22}$$

$$\theta' = \phi_C - \phi + \delta. \qquad \text{Equation 23}$$

$$n_L \sin(\delta) = n_C \sin(\theta) = 1.00 \sin(\phi+\gamma) \qquad \text{Equation 24}$$

$$n_b \sin(\epsilon) = n_L \sin(\theta'). \qquad \text{Equation 25}$$

$$\epsilon' = \phi_1 + \epsilon - \phi_C. \qquad \text{Equation 26}$$

$$\eta' = \phi_2 + \eta + \phi_1 \qquad \text{Equation 27}$$

$$n_W \sin(\alpha) = n_L \sin(\eta') \qquad \text{Equation 28}$$

$$\beta = \alpha - \phi_2, \qquad \text{Equation 29}$$

$$y' = R2 \sin(\phi_2) \qquad \text{Equation 30}$$

$$S1 = R1 - Sg - R_C' \qquad \text{Equation 31}$$

$$S2 = t_{max} + R_C - R2 \qquad \text{Equation 32}$$

equation 1 and a radius of curvature of the lens center $R_L$ (FIG. 6) defined by equation 2. A maximum thickness of the lens is also chosen for purposes of physical construction and ability to pass light. The index of refraction is controlled by the choice of materials which is selected as described above for optical reasons. In all cases, the maximum thickness of the lens is between 0.2 millimeters and 10 millimeters in addition to any reduction in the effective radius of curvature caused by the normal correction of vision by the contact lens.

In equation 1, $R_C$ (FIGS. 5 and 6) is the radius of curvature of the user's cornea, which is measured. The value of the letter "X" is calculated by equation 3. In equation 3, $R_L$, is the radius of the lens (FIG. 6) and s is given by equation 4. In equation 4, $t_{max}$ is the maximum thickness of the lens along the optical axis and is chosen as described above. For example, it may be 0.5 mm (millimeters).

Figure 5:
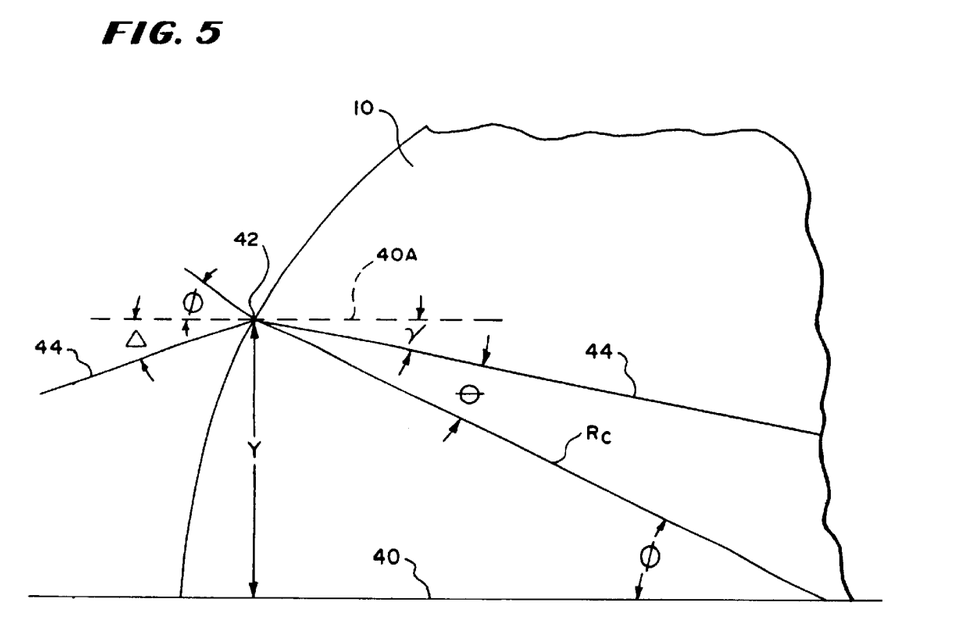
FIG. 5 is a diagrammatic showing of a cornea and the effect of light rays impinging upon it from the air.
Figure 7:
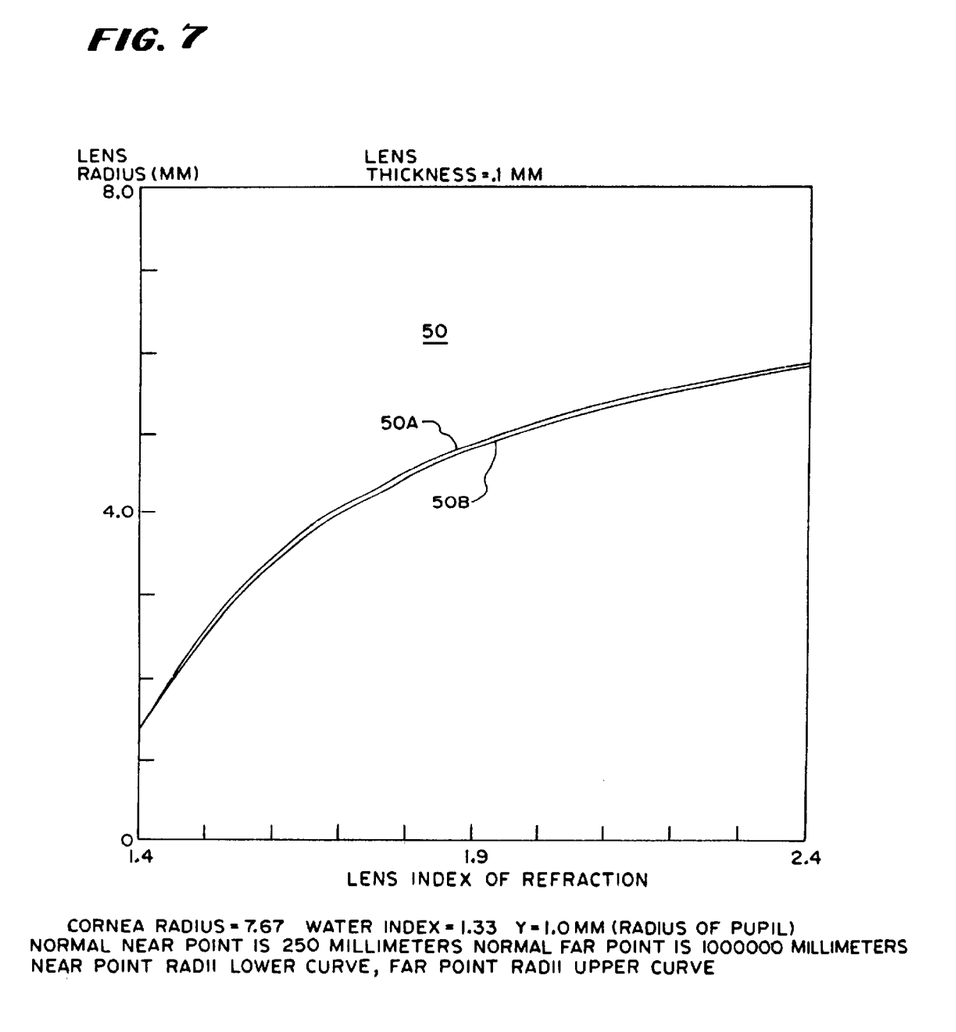
FIG. 7 is a graph showing two curves having ordinates of either near point lens radius or far point lens radius for underwater use and having abscissae of the lens index of refraction for an underwater lens having a given thickness, cornea radius, normal near point and normal far point.

In equation 2, phi prime (FIG. 6) and delta are angles associated with the near and far points of the user of the lens. The near and far points of the cornea of the user are determined by testing the cornea for its range of vision. The angles phi, phi prime, delta and other angles such as gamma are best illustrated by reference to FIGS. 5, 6 and 7, illustrating the use of a simple contact lens for underwater vision or filters or color to compensate for attenuation by water.

As shown in FIG. 6, a simple lens 12 rests upon a cornea 10. The lens 12 and cornea 10 have coincident optical axis of symmetry indicated by the line 40. Any point along the cornea 10 may be represented by the point 42 a distance, y, from the axis of symmetry 40. The distance, y, is chosen to be smaller than the pupil radius such as for example to be one millimeter. The near and far points are points along the optical axis 40 which define the range of light in focus, with the near point being closer to the lens than a normal between the lens and the axis 40 and the far point being further away from the lens to define the range of light in focus along the optical axis 40 passing through the cornea 10 and the lens 12. The line 44 shows an incident ray impinging on the lens 12 at 46 (FIG. 6) and being refracted as shown at 46 (FIG. 6) into a new path 44A. This path forms an angle, gamma, with a line 40A parallel to the optical axis 40 so that the angle gamma indicates the angle that the line 44 makes with 40 at the far point. Similarly, an angle gamma prime (not shown in FIG. 5) defines the near point of a ray of light falling within the range short of the focusing of the eye.

The distance, y, (FIG. 5) is the distance from the point 42 that the light enters the cornea 10 to the optical axis of symmetry 40. It reaches the axis 40 at a point not shown in FIG. 5.

Under these definitions, gamma, the distance, y, the near point and the far point are defined by equations 5 and 6. Since, according to Snell's law, the ratio of the sine of the angle of incidence, delta plus phi, (FIG. 5) from the normal of a beam of light to the sine of the angle of the refracted light (theta) leaving a refractive body to the normal is constant at a value that is called the refractive index for the material, equation 7 is true. Theta is the angle between the refracted light 44 within the cornea indicated as and the normal, $R_C$, to the cornea. Phi is the angle between the normal $R_C$ and the axis of symmetry 40. Equation 8 expresses the relationship between the sine of phi, the distance, y, from the point 42 to the axis of symmetry 40 and the radius of the cornea 10.

The near point and the far point of the eye when underwater with the lens 12 (FIG. 6) in place are given by equation 9. The distance, y prime, is correlated with the lens 12, the radius of curvature of the ends and the thickness as shown by FIG. 6. The angle gamma shown in FIG. 6 is similar in nature to the angle gamma shown in FIG. 5 and is the angle formed by the line 40A parallel to the optical axis 40. The index of refraction of the lens in $N_L$ (equation 10) multiplied by the sine of delta is equal to the index of refraction of the cornea times the sine of theta which is equal to the sine of (phi+gamma) as shown by equation 10.

In FIG. 6, it is shown that theta prime is equal to phi prime minus phi plus delta as shown by equation 11 and visibly shown in FIG. 6. In this equation, phi prime is the solution of equation 2 as described above. In equation 2, $R_L$ is the radius of curvature of the lens and s is the solution of equation 4. These equations must be solved by iteration but include sufficient relationships for such a solution. Alpha is determinable from Snell's law indicating that a ratio of the sine of an incident beam of light divided by the sine of the refracted beam of light is a constant. In this case, as shown by equation 12, where $n_W$ is the index of refraction of water and $n_L$ is the index of refraction of the lens, equation 12 shows the relationship indicated by Snell's law. Beta may be calculated from equation 13 and y prime may now be calculated from equation 14.

Tables 1, 2, 3 and 4 show the lens radius in mm (millimeters), the new near point in meters underwater with the lens in place, the new far point in meters underwater with the lens in place and the lens width in mm with an eye having a normal near point of 0.25 meters and a normal far point of 1,000 meters, a cornea radius of 7.67 millimeters, a cornea index of 1.376 and a water index of being 1.33 for: (1) a thickness of 0.3 mm., dense flint glass lens having an index of 1.68893; (2) a thickness of 0.5 mm., dense flint glass lens having an index of 1.68893; (3) a thickness of 0.3 mm., a flint glass lens having an index of 1.62045; and (4) a thickness of 0.5 mm., a flint glass lens having an index of 1.62045.

In FIGS. 7, 8, 9 and 10, there are shown four graphs, 50, 52, 54 and 56 respectively, of the lens radius against the index of refraction, each having two curves 50A, 50B; 52A, 52B; 54A, 54B and 56A, 56B respectively, for a cornea radius of 7.67 millimeters and a radius of the pupil of 1.0 millimeter, a normal near point of 250 millimeters, a normal far point of one million millimeters, an index of refraction of water being 1.33. In each of these graphs, the upper curve 50A–56A is the far point and the lower curve 50B–56B is the near point. FIG. 7 is for a lens thickness of cornea radius is 7.67 mm cornea index is 1.376 water index is 1.33 normal near point is 0.25 meters, normal far point is 1000 meters

TABLE 1

| LENS THICKNESS = .3   LENS INDEX = 1.68893 DENSE FLINT GLASS ||||
|---|---|---|---|
| LENS RADIUS | NEW NEAR POINT | NEW FAR POINT | LENS WIDTH |
| 3.98 | .1797557 | .3834364 | 4.163908 |
| 3.99 | .1859688 | .4127877 | 4.174372 |
| 4 | .192586 | .4458039 | 4.184855 |
| 4.01 | .1996479 | .486663 | 4.195365 |
| 4.02 | .2072053 | .5340682 | 4.205905 |
| 4.030001 | .215312 | .5913427 | 4.216464 |
| 4.040001 | .2240298 | .6619486 | 4.227052 |
| 4.050001 | .2334268 | .7511325 | 4.23766 |

TABLE 1-continued

| LENS THICKNESS = .3   LENS INDEX = 1.68893 DENSE FLINT GLASS ||||
|---|---|---|---|
| LENS RADIUS | NEW NEAR POINT | NEW FAR POINT | LENS WIDTH |
| 4.060001 | .243592 | .8673758 | 4.248292 |
| 4.070002 | .2546157 | 1.025127 | 4.258952 |
| 4.080002 | .2666169 | 1.251482 | 4.269648 |
| 4.090002 | .2797335 | 1.603759 | 4.280361 |
| 4.100002 | .2941179 | 2.227346 | 4.291101 |
| 4.110003 | .3099748 | 3.632429 | 4.301861 |
| 4.120003 | .3275419 | 9.740257 | 4.312652 |
| 4.130003 | .3471092 | −14.46449 | 4.323474 |
| 4.140003 | .3690337 | −4.167622 | 4.334318 |
| 4.150003 | .3937721 | −2.439554 | 4.34519 |
| 4.160004 | .4219072 | −1.727193 | 4.356091 |
| 4.170004 | .4541858 | −1.338526 | 4.367022 |
| 4.180004 | .4915944 | −1.09364 | 4.377977 | cornea radius is 7.67 mm cornea index is 1.376 water index is 1.33 normal near point is 0.25 meters, normal far point is 1000 meters

TABLE 2

| LENS THICKNESS = .5   LENS INDEX = 1.68893 DENSE FLINT GLASS ||||
|---|---|---|---|
| LENS RADIUS | NEW NEAR POINT | NEW FAR POINT | LENS WIDTH |
| 3.98 | .1601005 | .2984333 | 5.149691 |
| 3.99 | .1650214 | .31596 | 5.162363 |
| 4 | .170222 | .335558 | 5.175056 |
| 4.01 | .1757293 | .357613 | 5.187779 |
| 4.02 | .1815749 | .3826292 | 5.200529 |
| 4.030001 | .1877834 | .4112252 | 5.213303 |
| 4.040001 | .194395 | .4442555 | 5.226106 |
| 4.050001 | .2014485 | .4828227 | 5.238934 |
| 4.060001 | .2089896 | .5284522 | 5.251787 |
| 4.070002 | .2170702 | .5832475 | 5.264664 |
| 4.080002 | .2257544 | .6503236 | 5.277575 |
| 4.090002 | .2351073 | .7343581 | 5.290512 |
| 4.100002 | .2452139 | .8425835 | 5.303476 |
| 4.110003 | .2561611 | .9873636 | 5.3166462 |
| 4.120003 | .2680659 | 1.190849 | 5.329484 |
| 4.130003 | .2810594 | 1.498002 | 5.342526 |
| 4.140003 | .2952947 | 2.014743 | 5.355604 |
| 4.150003 | .310961 | 3.067153 | 5.368707 |
| 4.160004 | .3282832 | 6.385942 | 5.38184 |
| 4.170004 | .3475426 | −84.37585 | 5.395002 |
| 4.180004 | .3690829 | −5.56995 | 5.408195 | cornea radius is 7.67 mm cornea index is 1.376 water index is 1.33 normal near point is 0.25 meters, normal far point is 1000 meters

TABLE 3

LENS THICKNESS = .3     LENS INDEX = 1.62045
FLINT GLASS

| LENS RADIUS | NEW NEAR POINT | NEW FAR POINT | LENS WIDTH |
|---|---|---|---|
| 3.62 | .2048446 | .5218749 | 3.801977 |
| 3.63 | .2129371 | .5777193 | 3.811671 |
| 3.64 | .2216385 | .6464142 | 3.821395 |
| 3.65 | .2310164 | .7329967 | 3.831137 |
| 3.66 | .2411607 | .8456165 | 3.840893 |
| 3.67 | .2521651 | .998001 | 3.850665 |
| 3.68 | .2641451 | 1.215711 | 3.860456 |
| 3.69 | .2772313 | 1.552259 | 3.870276 |
| 3.7 | .2915931 | 2.141832 | 3.880106 |
| 3.71 | .3074151 | 3.43911 | 3.889958 |
| 3.72 | .3249396 | 8.645696 | 3.899835 |
| 3.73 | .34447 | −17.13889 | 3.909729 |
| 3.74 | .366351 | −4.321361 | 3.919639 |
| 3.75 | .3910325 | −2.479273 | 3.929567 |
| 3.76 | .4191024 | −1.741069 | 3.939518 | cornea radius is 7.67 mm cornea index is 1.376 water index is 1.33 normal near point is 0.25 meters, normal far point is 1000 meters

TABLE 4

LENS THICKNESS = .5     LENS INDEX = 1.62045
FLINT GLASS

| LENS RADIUS | NEW NEAR POINT | NEW FAR POINT | LENS WIDTH |
|---|---|---|---|
| 3.62 | .1830155 | .3913716 | 4.70902 |
| 3.63 | .1894658 | .4220273 | 4.720887 |
| 3.64 | .1963409 | .4576474 | 4.73278 |
| 3.65 | .203686 | .4995627 | 4.744682 |
| 3.66 | .2115495 | .5495751 | 4.756615 |
| 3.67 | .2199945 | .6102772 | 4.768565 |
| 3.68 | .2290771 | .6855424 | 4.78053 |
| 3.69 | .2388848 | .7813019 | 4.79252 |
| 3.7 | .2494948 | .9073336 | 4.804525 |
| 3.71 | .261019. | 1.080541 | 4.816557 |
| 3.72 | .2735821 | 1.333442 | 4.828607 |
| 3.73 | .2873308 | 1.737701 | 4.840681 |
| 3.74 | .302427 | 2.487704 | 4.852768 |
| 3.75 | .3190984 | 4.355463 | 4.864882 |
| 3.76 | .3376012 | 17.16046 | 4.877012 |

Figure 8:
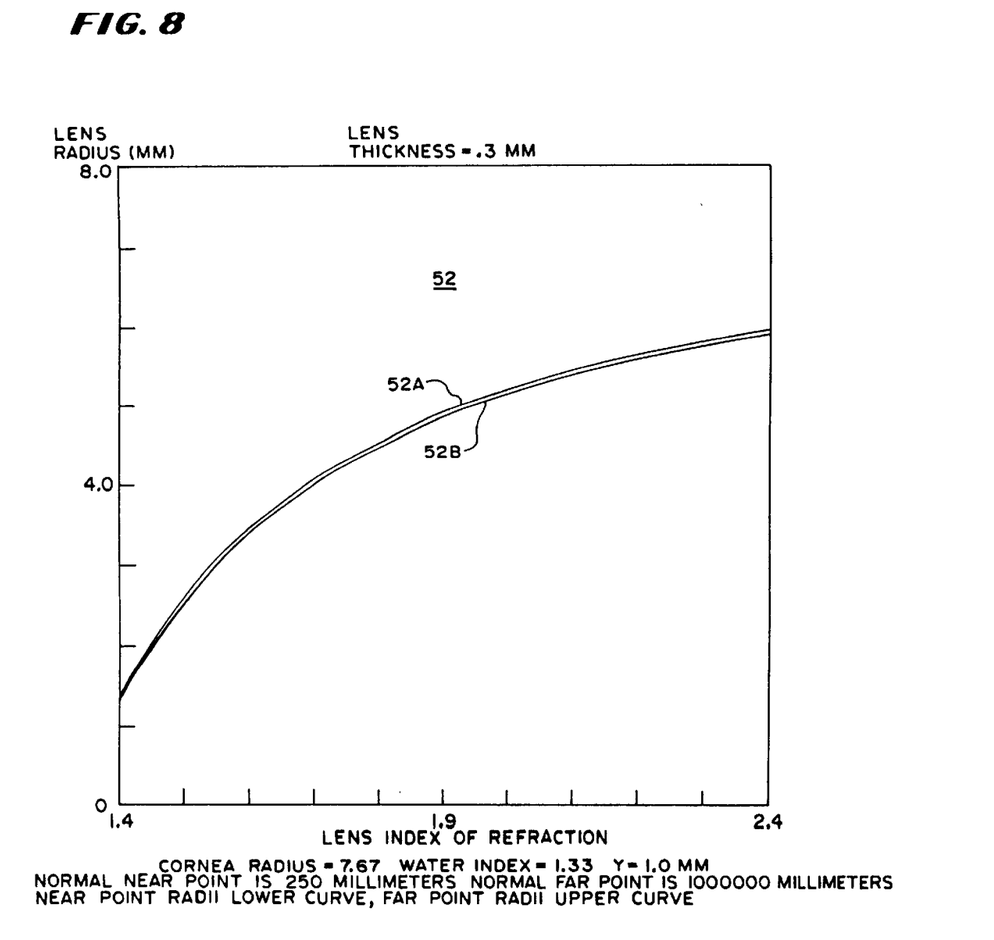
FIG. 8 is a graph showing two curves with ordinates of either near point lens radius or far point lens radius for underwater use and having abscissae of lens index of refraction for a given cornea radius, normal near point, normal far point and lens thickness.
Figure 9:
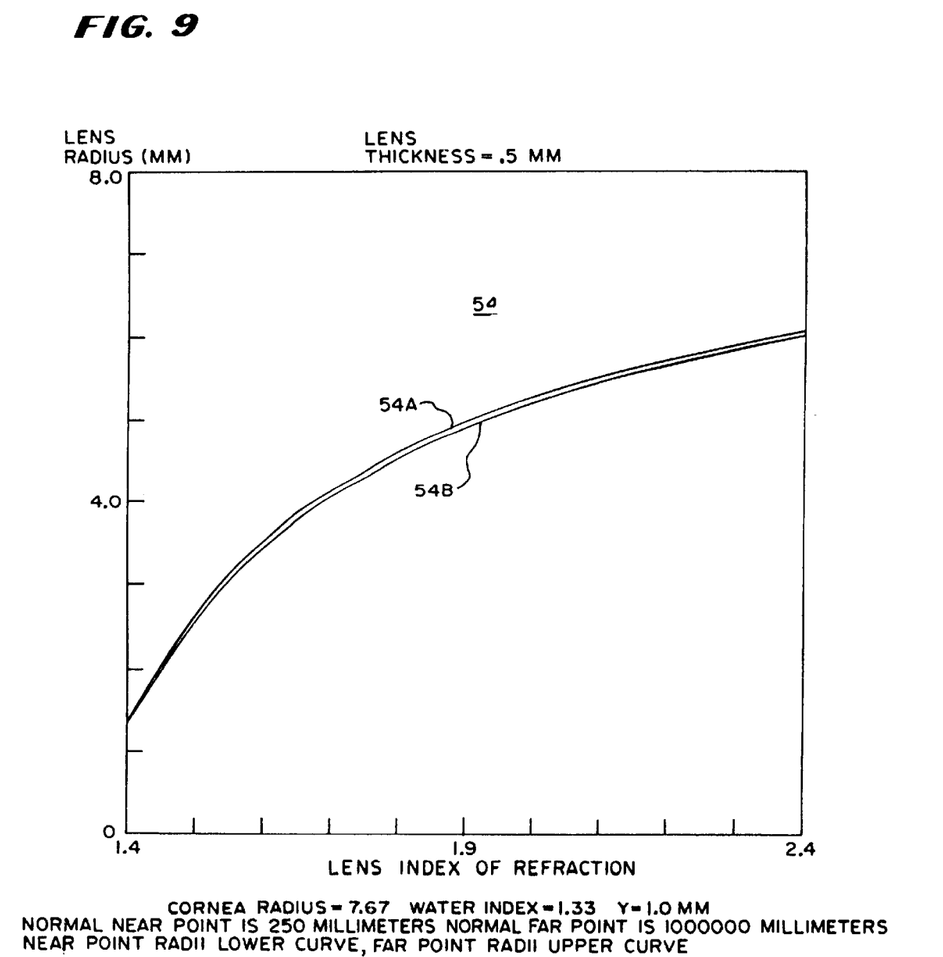
FIG. 9 is still another graph showing two curves having ordinates of either near point lens radius or far point lens radius for underwater use and having abscissae of lens index of refraction, for a given cornea radius, normal near point, normal far point and lens thickness.
Figure 10:
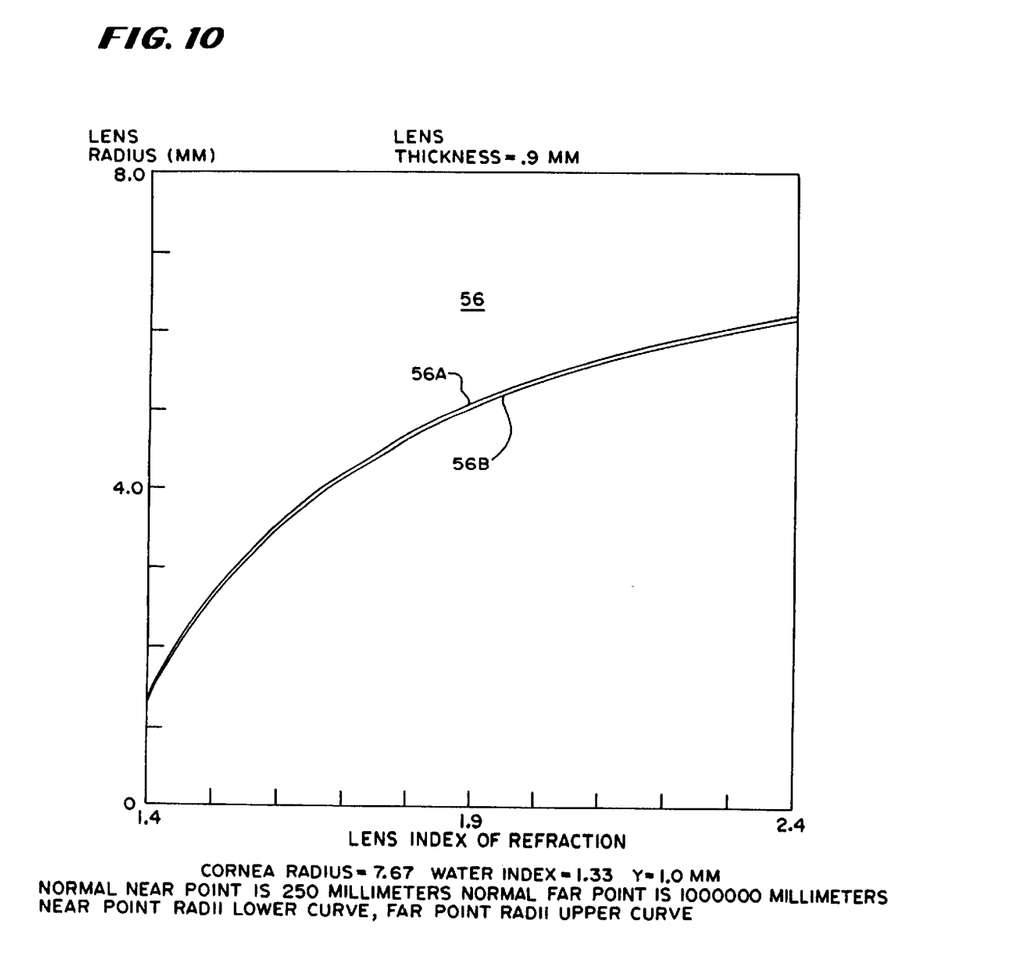
FIG. 10 is still another graph showing two curves having either upper lens radius or lower lens radius for underwater as ordinates and having lens index of refraction as abscissae for still another lens with given thickness, cornea radius, normal near point and normal far point.

0.1 millimeter, FIG. 8 is for a lens thickness of 0.3 millimeter and FIG. 9 is for a lens thickness of 0.5 millimeter and FIG. 10 is for a lens thickness of 0.9 millimeter.

Figure 11:
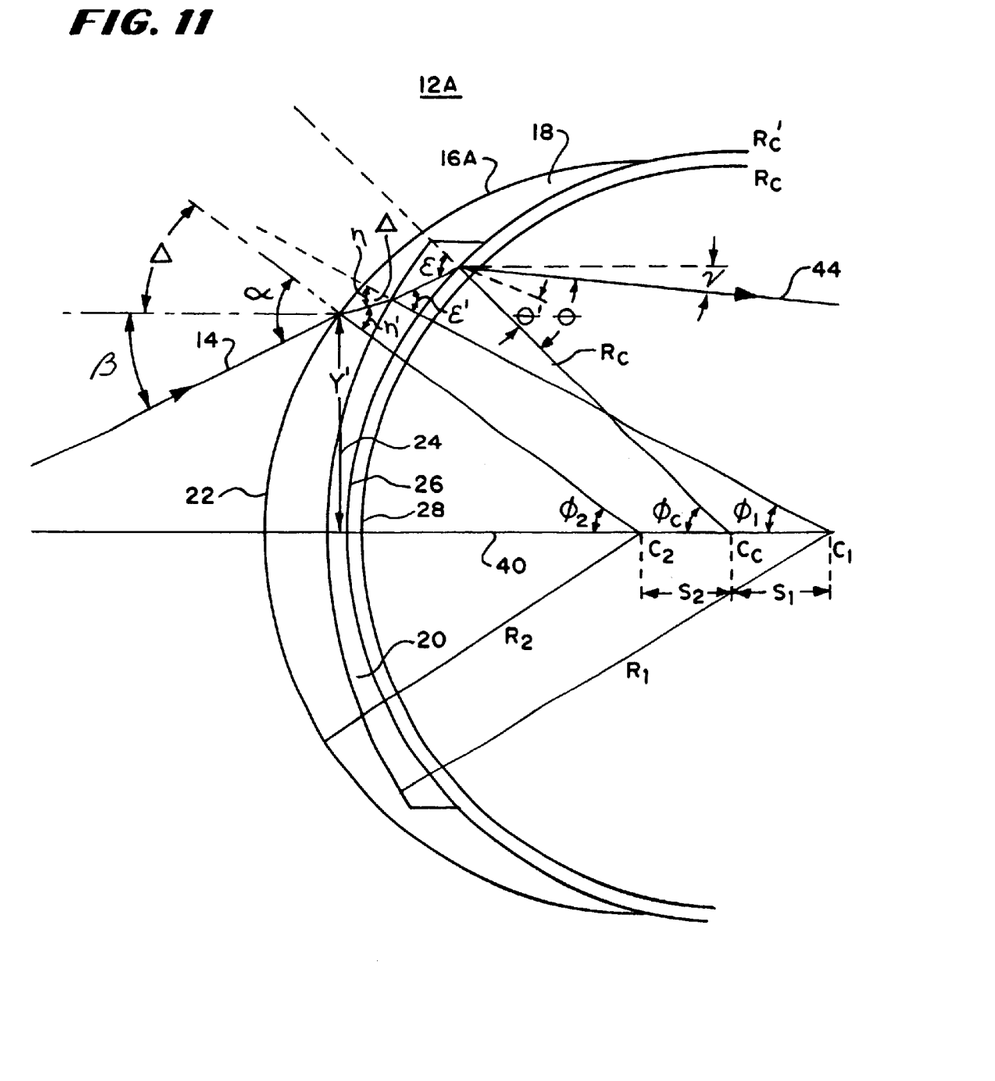
FIG. 11 is a side elevational view of the bubble lens of FIG. 4 having upon it lines illustrating the effect of the bubble type lens underwater on a cornea.

In FIG. 11, there is shown the sectional view of the lens 12A of FIG. 4 indicating upon it the parameters involved in the design of an above-below water lens. The bubble lens 12A in FIG. 11 includes one more refraction than the lens of FIG. 6 when underwater, but the basic relationships are the same except extended for the additional refraction.

With this type of lens, the radius of curvature, $R_1$, of the bubble 20 on its outer surface is provided by equation 15 in which phi 1 is the angle made by a radius from the center of curvature of the plastic-to-air interface 24 to the optical axis 40, $R_C$ prime is the radius of curvature of a thin film normally found on the cornea of an eye and thus equals the radius of curvature of the cornea plus a small increment such as approximately 0.1 millimeter, phi C is the radius of the curvature of the cornea, s1 is equal to the radius of curvature of the wall 24 to the bubble 20, and epsilon is the angle made by the ray of light 14 within the bubble 20 with the radius $R_C$. In forming the angle epsilon, the radius $R_C$ intersects the ray of light 14 at the boundary between the wall 26 of the bubble adjacent to a thin film on the eye. The bubble 20 may be filled with air or any other material of known refractive index but is preferably air. It is ground into the inner surface of the lens 18, and in the case of air, is formed when the lens is inserted on the cornea to be supported by the peripheral portions and create an air space 20.

The radius of curvature, $R_2$, of the lens 18 is provided by equation 16 where: (1) phi 2 is the angle formed by the optical axis and the radius of curvature of the lens 18 at an arbitrarily selected point y prime assumed to be y prime millimeters from the optical axis where the beam of light 44 strikes the lens 18; (2) phi 1 is the angle formed between the optical axis and the radius of curvature of the wall 24 of the bubble 20 at the point where the beam of light 44, after refraction at the water lens interface strikes the outer wall 24 of the bubble 20; (3) S2 is equal to the maximum thickness of the lens plus the radius of curvature of the cornea minus R2 and eta is provided by equation 21. The width of the bubble, $W_b$, is provided by equation 17 in which the value, X1, is provided by equation 18. In equation 18, the minimum horizontal thickness of the lens, d, may be assumed to be a very low value such as 0.1 millimeter. This value is selected for strength. The width of the lens, $W_L$, is provided by equation 19 in which the value, X, is provided by equation 20.

To obtain these design equations, the angle, $phi_C$ prime, for the cornea, can be obtained by solving equation 22 by iteration. In equation 22, $R_C$ is the radius of curvature of the thin film over the cornea and delta is the angle between the radius of the curvature of the lens and the angle of the light after being refracted by the interface between the lens and the water while it is within the lens as shown in FIG. 11. The angle, theta prime, is given by equation 23 using the value for the angle that a radius of curvature of the cornea passing through the selected point for the beam of light 44 at the interface of the lens and the thin film over the cornea makes with the optical axis 40. From Snell's law, delta can be obtained from equation 24.

Epsilon can be expressed from Snell's law and obtained from equation 25. Once epsilon has been found from equation 25, epsilon prime may be found from equation 26 using the value of phi 1 from equation 15. Theta prime may be found from equation 27 using the values of phi 2 from equation 16. Again using Snell's law, alpha may be expressed and found from equation 28 where $n_W$ is the index of refraction of water which is generally taken to be 1.33. In equation 25, $n_b$ is the index of refraction of the bubble material which is generally 1 for air and $n_L$ is the index of refraction of the lens material. The one axis thickness of the bubble itself, $S_g$ (equation 31), will be a very low value such as 0.1 millimeters. The angles beta and the arbitrary distance, y prime, and the corresponding angle phi 2 are given by equations 29 and 30. The distances s1 and s2 are given by equations 31 and 32 respectively.

Table 5 and table 6 show the maximum thickness of the lens of 0.5 and 0.6 millimeters respectively for borosillicate crown glass with an index of refraction of 1.52 at a series of near points, far points, underwater for different inner radii, outer radii, bubble widths and lens widths for the bubbletype embodiment of FIG. 4 respectively. Tables 7 and 8 show the same parameters but for fused silica glass with an index of refraction of 1.458.

Figure 12:
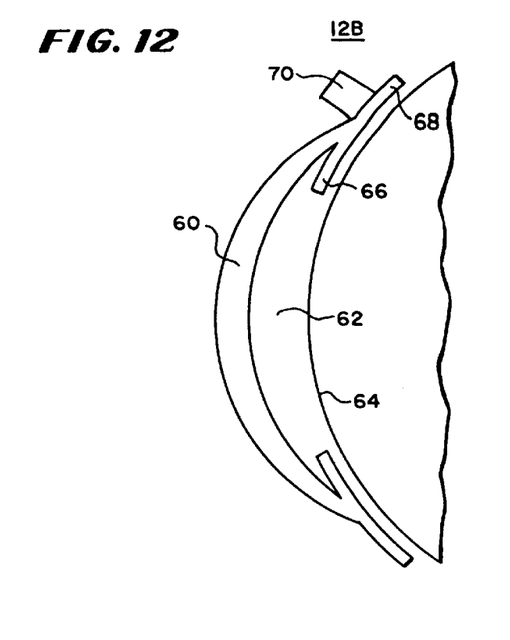
FIG. 12 is a sectional fragmentary view of an eye and another embodiment of underwater contact lens.

In FIG. 12, there is shown a sectional view of still another embodiment of lens 12B having a solid glass or plastic curved portion 60, which may be stiff or flexible, with an inner hollow portion 62 filled with a gel or air or a light filtering material. The inner hollow portion 62 between the cornea 64 of the eye and or prevent the surfaces from receiving condensation and becoming fogged.

An inner annular lip 66 extends inwardly from the ends of the lens portion 60 and is sufficiently large in contact area to

TABLE 5

MAXIMUM THICKNESS OF THE LENS IS .5000000000001 (MM)

| INNER RADIUS R1 (MM) | OUTER RADIUS R2 (MM) | NEW NEAR POINT (M) | NEW FAR POINT (M) | BUBBLE WIDTH (MM) | LENS WIDTH (MM) |
|---|---|---|---|---|---|
| 13.67736 | 5 | .3127572 | 4.677268 | 3.46848 | 6.01511 |
| 15.0451 | 5.5 | .3279974 | 15.27561 | 3.64552 | 6.84352 |
| 16.41283 | 6 | .3396523 | −25.55216 | 3.81439 | 7.86668 |
| 17.78057 | 6.5 | .3486612 | −8.672148 | 3.97612 | 9.20273 |
| 19.1483 | 7 | .3557075 | −5.803835 | 4.13153 | 11.08558 |
| 20.51604 | 7.5 | .3612852 | −4.631448 | 4.28133 | 13.96175 |

TABLE 6

| INNER RADIUS R1 (MM) | OUTER RADIUS R2 (MM) | NEW NEAR POINT (M) | NEW FAR POINT (M) | BUBBLE WIDTH (MM) | LENS WIDTH (MM) |
|---|---|---|---|---|---|
| 13.67736 | 5 | .3061148 | 3.436026 | 4.19868 | 6.56024 |
| 15.0451 | 5.5 | .3220611 | 7.767337 | 4.41764 | 7.43733 |
| 16.41283 | 6 | .3343835 | 72.93126 | 4.62633 | 8.50356 |
| 17.78057 | 6.5 | .3439957 | −14.18833 | 4.82607 | 9.86292 |
| 19.1483 | 7 | .351575 | −7.475701 | 5.01791 | 11.70214 |
| 20.51604 | 7.5 | .357618 | −5.481732 | 5.20272 | 14.28227 |

TABLE 7

MAXIMUM THICKNESS OF THE LENS IS .5000000000001 (MM)

| INNER RADIUS R1 (MM) | OUTER RADIUS R2 (MM) | NEW NEAR POINT (M) | NEW FAR POINT (M) | BUBBLE WIDTH (MM) | LENS WIDTH (MM) |
|---|---|---|---|---|---|
| 17.84447 | 5 | .331646 | 37.59534 | 3.27144 | 6.01511 |
| 19.62891 | 5.5 | .3431446 | −13.49949 | 3.43701 | 6.84352 |
| 21.41336 | 6 | .3516722 | −6.916899 | 3.59498 | 7.86668 |
| 23.1978 | 6.5 | .3581003 | −5.113378 | 3.74631 | 9.20273 |
| 24.98225 | 7 | .3630239 | −4.283347 | 3.89176 | 11.08558 |
| 26.7667 | 7.5 | .3668527 | −3.812695 | 4.03198 | 13.96175 |

TABLE 8

| INNER RADIUS R1 (MM) | OUTER RADIUS R2 (MM) | NEW NEAR POINT (M) | NEW FAR POINT (M) | BUBBLE WIDTH (MM) | LENS WIDTH (MM) |
|---|---|---|---|---|---|
| 17.84447 | 5 | .3282272 | 15.73177 | 3.96901 | 6.56024 |
| 19.62891 | 5.5 | .3401924 | −22.8426 | 4.17347 | 7.43733 |
| 21.41336 | 6 | .3491244 | −8.385049 | 4.36842 | 8.50356 |
| 23.1978 | 6.5 | .3558962 | −5.744405 | 4.55506 | 9.86292 |
| 24.98225 | 7 | .36111 | −4.651396 | 4.73438 | 11.70214 |
| 26.7667 | 7.5 | .3651835 | −4.061434 | 4.90716 | 14.28227 | the plastic or glass curved lens portion 60 is filled with a gel, gas, liquid or other material that together with the plastic or glass lens 60 provides the desired refractive correction to vision. The gel, gas, liquid or other material may also compensate for the frequencies of light filtered by the water seal the hollow portion 62 against escape of fluid if pressure is applied to the curved portion 60. The sealing occurs because the pressure is also applied to the top surface of the lip 66 and adhesion is increased between the cornea and bottom surface of the lip 66 by the increased area of contact. An outer annular lip 68 extends outwardly from the end of the wall 60 and provides additional sealing against the cornea. A tab 70 extends upwardly from the outer annular lip and may be gripped to pull the contact lens from the eye and is sufficiently large to be gripped and used to retain the contact lens when desired on the cornea.

Figure 13:
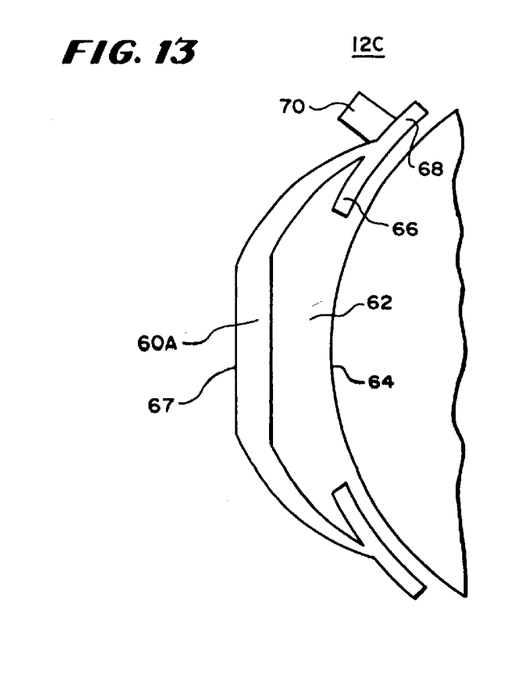
FIG. 13 is a sectional fragmentary view of an eye and still another embodiment of underwater contact lens.

The embodiment of FIG. 13 is similar to the embodiment of FIG. 12 and corresponding elements are indicated with the same reference numerals. However, the embodiment of FIG. 13 includes a lens portion 60A with a flat surface 67 instead of the curved surface of the lens 60. In a modification of the embodiments of FIGS. 12 and 13, there may be a space directly between the cornea and the inner surface of the lens to contain air, liquid gel or solid substance to aid in refractive correction, to prevent fogging, to filter light or, to serve as an antiseptic or analgesic.

As can be understood from the above description, the underwater contact lens of this invention has several advantages, such as for example: (1) it has a wide field of vision under the water; (2) it is relatively simple and inexpensive for an underwater viewing device; and (3) it is simple and compact.

Although a preferred embodiment of the invention has been described with some particularity, many modifications and variations of the preferred embodiment can be made without deviating from the invention. It is therefore to be understood that, within the scope of the appended claims, the invention may be practiced other than as specifically described.

We claim:

1. An underwater contact lens comprising:

a correction portion and a peripheral portion;

the peripheral portion having a curved annular surface adapted for contact with an eyeball wherein the contact lens is held in place;

the correction portion of the contact lens having correction means for underwater viewing to correct for the difference between underwater viewing and viewing in air;

said contact lens being sufficiently flexible to substantially uniformly contact the cornea of an eye;

the peripheral portion being of sufficient size and shape to hold the contact lens to the cornea of the eye; and means for changing the correction of the contact lens for above water viewing.

2. An underwater contact lens in accordance with claim 1 in which the corrective portion has a refractive index greater than that of water and a curvature and thickness, wherein the refractive index, thickness and curvature are sufficient to provide light correction that causes the light to focus properly and compensate for the differences in the index of refraction between air and water.

3. An underwater contact lens in accordance with claim 1 in which the material of the contact lens is polyethylene glycol.

4. A contact lens according to claim 1 wherein a refractive index is between that for underwater correction and above water correction whereby the contact lens may be worn above the water or under the water with adequate correction.

5. An underwater contact lens in accordance with claim 1 wherein the corrective portion includes at least part of a compartment wherein the compartment may affect visual correction.

* * * * *